(12) United States Patent
Gunaratne

(10) Patent No.: US 9,007,198 B2
(45) Date of Patent: Apr. 14, 2015

(54) ADAPTIVE ACTUATOR INTERFACE FOR ACTIVE DRIVER WARNING

(71) Applicant: Toyota Motor Eng. & Mtfg. North America, Erlanger, KY (US)

(72) Inventor: Pujitha Gunaratne, Windsor (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 131 days.

(21) Appl. No.: 13/667,445

(22) Filed: Nov. 2, 2012

(65) Prior Publication Data

US 2014/0125474 A1 May 8, 2014

(51) Int. Cl.
*B60Q 1/00* (2006.01)
*B60Q 9/00* (2006.01)
*G08B 21/06* (2006.01)
*G08G 1/16* (2006.01)
*G08B 7/06* (2006.01)

(52) U.S. Cl.
CPC . *B60Q 9/008* (2013.01); *G08B 7/06* (2013.01); *G08B 21/06* (2013.01); *G08G 1/163* (2013.01)

(58) Field of Classification Search
USPC .......................................... 340/439, 575, 576
See application file for complete search history.

(56) References Cited

U.S. PATENT DOCUMENTS

| | | | |
|---|---|---|---|
| 5,642,093 A | 6/1997 | Kinoshita et al. | |
| 6,859,144 B2 | 2/2005 | Newman et al. | |
| 7,253,724 B2 | 8/2007 | Prakah-Asante et al. | |
| 7,302,344 B2 | 11/2007 | Olney et al. | |
| 7,592,920 B2 | 9/2009 | Kopf et al. | |
| 7,609,150 B2 | 10/2009 | Wheatley et al. | |
| 7,639,148 B2 | 12/2009 | Victor | |
| 8,275,348 B2 * | 9/2012 | Yen et al. | 455/404.1 |
| 2003/0096594 A1 * | 5/2003 | Naboulsi | 455/411 |
| 2004/0088095 A1 | 5/2004 | Eberle et al. | |
| 2008/0167820 A1 | 7/2008 | Oguchi et al. | |
| 2008/0204256 A1 * | 8/2008 | Omi | 340/575 |
| 2010/0007479 A1 | 1/2010 | Smith | |
| 2010/0295707 A1 * | 11/2010 | Bennie et al. | 340/988 |
| 2011/0006903 A1 | 1/2011 | Niem | |
| 2012/0286957 A1 * | 11/2012 | Frechette et al. | 340/575 |
| 2012/0306637 A1 * | 12/2012 | McGough et al. | 340/439 |
| 2012/0326855 A1 * | 12/2012 | Bantz et al. | 340/439 |

OTHER PUBLICATIONS

U.S. Appl. No. 13/750,137, filed Jan. 25, 2013, Gunaratne

\* cited by examiner

*Primary Examiner* — Brent Swarthout
(74) *Attorney, Agent, or Firm* — Oblon, McClelland, Maier & Neustadt, L.L.P.

(57) ABSTRACT

A method, system, device and computer readable medium for adaptively warning a driver includes detecting a behavior of the driver, the behavior including engagement in a secondary activity, which is an activity other than driving a vehicle. Based on the detected behavior, a level of engagement in the secondary activity is estimated, and, based on the estimated level of engagement in the secondary activity, the driver's level of perception of an external hazard is determined. A warning alert for the driver, when the level of perception is below a threshold is actuated. A reaction of the driver to the actuated warning alert is determined. Based on the reaction of the driver to the actuated warning alert, the warning alert is adjusted, and the warning alert is terminated when the level of perception becomes above the threshold because of the reaction of the driver to the actuated warning alert.

20 Claims, 17 Drawing Sheets

ADAPTIVE ACTUATOR INTERFACE FOR ACTIVE DRIVER WARNING

BACKGROUND

This application relates to Pre-Collision Safety (PCS) driver warning systems that measure and analyze physical parameters for assessing a probability of a crash. In conventional PCS driver warning systems, a driver warning can be actuated when a measured physical parameter that is associated with a crash exceeds a collision threshold.

SUMMARY OF THE ILLUSTRATIVE EMBODIMENTS

Aspects of this disclosure relate to methods, systems, algorithms, means, controllers, and processes for warning a driver based on proximity and severity of external hazardous situations, and the driver's perception of the external hazardous situations. In some aspects, the driver can be adaptively warned by actuating a warning mechanism based on the proximity and severity of the external hazardous situations, the driver's current perceptive behavior, and/or the driver's level of engagement in secondary activities.

A probability of a crash in a PCS system can be determined by analyzing physical parameters, including one or more of: a relative speed between a vehicle and other vehicles in a vicinity of the vehicle, a relative speed between a vehicle and a moving object, a distance between a vehicle and an external object, and acceleration or deceleration of a vehicle. In some aspects, a warning can be generated based on measurements of the physical parameters that do not take into account the driver's behavior. In other aspects, a PCS system can rely on the stated physical parameters, while taking into consideration the driver being distracted and/or not fully engaged in controlling the vehicle.

Some aspects of this disclosure relate to a mechanism to adapt a warning actuator interface in an iterative process by detecting a driver's perceptive behavior and by actuating timely warnings based on the detected behavior.

An apparatus to adaptively warn a driver can include a detector configured to detect a behavior of the driver, the behavior including engagement in a secondary activity, which is an activity other than driving a vehicle, and further configured to detect a reaction of the driver to an actuated warning alert. A processor can be configured to estimate, based on the detected behavior, a level of engagement in the secondary activity, determine, based on the estimated level of engagement in the secondary activity, the driver's level of perception of an external hazard. An actuator can be configured to actuate a warning alert for the driver, when the level of perception is determined to be below a threshold by the processor. The processor can be configured to adjust an actuated warning alert of the actuator based on a detected reaction, by the detector, of the driver to the actuated warning alert.

The processor can be configured to terminate an actuated warning alert when the driver's level of perception is determined to be above the threshold by the processor, based on a reaction of the driver to the actuated warning alert.

The driver's level of perception that is required for the driver to safely control the vehicle can be determined based on reaction time delays of the secondary activities.

Predetermined reaction time delays for different secondary activities can be used as baseline values, and a new set of reaction time delays are generated by the processor based on monitored behavior of the driver to personalize the reaction time delays.

The new set of reaction time delays can be generated in a personalization process, which is performed in situations where no external hazard is present and the driver is engaged in secondary activities, such that personalized reaction time delays for the driver are generated by detecting the driver's reaction time to quit secondary activities and to fully engage in driving.

A non-transitory computer readable medium including executable instructions, which when executed by a processor, can cause the processor execute a method for adaptively warning a driver.

A method for adaptively warning a driver can include detecting a behavior of the driver, the behavior including engagement in a secondary activity, which is an activity other than driving a vehicle. Based on the detected behavior, a level of engagement in the secondary activity can be estimated. Based on the estimated level of engagement in the secondary activity, the driver's level of perception of an external hazard can be determined. A warning alert for the driver, when the level of perception is determined to be below a threshold based on a result of the determining can be actuated. A reaction of the driver to the actuated warning alert can be detected. Based on the detecting of the reaction of the driver to the actuated warning alert, the warning alert can be adjusted. The warning alert can be terminated when the level of perception becomes above the threshold because of the reaction of the driver to the actuated warning alert.

Inputs from the driver about a status of the driver can be received. Reaction time delays for the secondary activities can be estimated based on baseline indices.

Types of hazard alerts being actuated can be selected based on a state of the driver.

The level of perception that is required for the driver to safely control the vehicle can be determined based on reaction time delays of the secondary activities.

Predetermined reaction time delays for different secondary activities can be used as baseline values, and a new set of reaction time delays can be generated based on monitored behavior of the driver to personalize the reaction time delays.

The new set of reaction time delays can be generated in a personalization process, which can be performed in situations where no external hazard is present and the driver is engaged in secondary activities, such that personalized reaction time delays for the driver are generated by detecting the driver's reaction time to quit secondary activities and to fully engage in driving.

The warning alert for the driver can include one or more of: varying aroma sensations, warning messages and icons in different colors and contrast, sounds with varying tone and pitch, and vibrations in the driver's seat, steering wheel, headrest area.

The external hazard can be monitored, and the hazard level can be adjusted based on results of the monitoring.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
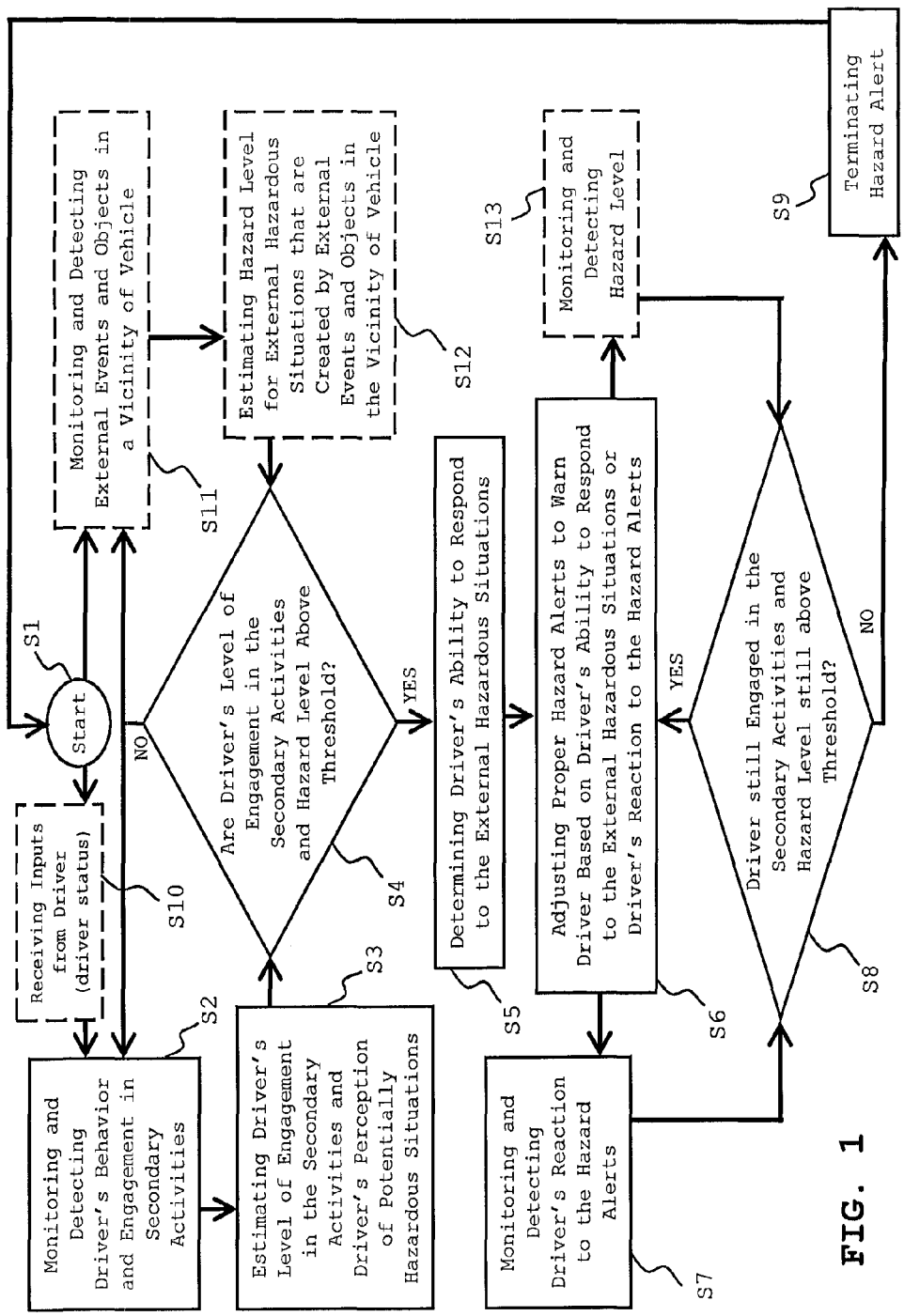
FIG. 1 is a process flow chart of an algorithm for an adaptive warning mechanism.

In the drawings, like reference numerals designate identical or corresponding parts throughout the several views.

In situations where a driver is distracted, the driver may not be fully attentive to notice a warning generated by a PCS driver warning system. According to some aspects of this disclosure, a PCS system considers a driver's awareness in response to a warning in hazardous situations. A mechanism according to an implementation of this disclosure may detect a driver's perceptive behavior, and adapt an actuator interface accordingly, which can provide actuating calibrated adaptive warnings to effectively alert the driver to avoid a hazardous situation. The mechanism can be provided by a hardware controller, such as an electronic control unit (ECU), or a discrete processing circuit. The mechanism can also be provided by a computer executing a computer program. As discussed in detail below, the mechanism can be an adaptive warning mechanism that timely actuates and adjusts hazard alerts to warn a driver based on the driver's behavior and perception of potentially hazardous situations.

Herein, the adaptive warning mechanism is described in the context of a driver and a vehicle, but this is merely an exemplary implementation. An adaptive warning mechanism can be implemented with an operator that is operating one of various machines and equipment where a hazardous situation can occur, and the operator's timely and proper reaction is required in such hazardous situations to minimize the risk of a catastrophic event. Here, the operator's engagement in one of several secondary activities reduces the operator's full alertness, and ability to timely react. Examples of similar circumstances (man-machine operations) where operator alertness is required for safe operation include, but are not limited to, an operator controlling/monitoring a train, an airplane, a ship, machine shop equipment, laboratory equipment, and/or medical equipment.

FIG. 1 is an exemplary block diagram of the adaptive warning mechanism. The blocks with dashed borders illustrate optional steps that may be used in various embodiments of this disclosure. In the following, an algorithm for an exemplary embodiment is described in detail.

Initializing Adaptive Warning Mechanism

At S1 of FIG. 1, initialization of the adaptive warning mechanism and an initial evaluation are performed. The initial evaluation includes, but is not limited to, one or more steps to test proper operation of one or more adaptive warning devices to detect and distinguish a driver, check the drivers weight and age, and/or to check status of tires and brakes. As a result of the initial evaluation, an indicator can be activated to notify a successful completion of the initial evaluation.

At step S10, the driver may provide one or more inputs to the adaptive warning device using, for example, a touch screen display or a keyboard. Examples of the inputs include, but are not limited to, the driver's status that is the driver's general level of alertness to control the vehicle, verifying a detected driver, how long the driver has been driving, the driver's vision, the driver's experience, the driver's age, and/or general settings for operations of the adaptive warning device. Such inputs can be used by the adaptive warning mechanism to decide the most effective methods to alert a driver. As an example, when a driver is sleepy, the driver inputs information about sleepiness to the adaptive warning mechanism. The sleepy driver might not be able to notice visual hazard alerts. Therefore, the adaptive warning mechanism generates an alert based on sound or vibration to warn the driver.

Detecting Driver's Behavior

In step S2, the driver's behavior and the driver's engagement in secondary activities are monitored and detected using one or more sensors. The sensors may be multi-modal sensors. As an example, one or more image sensors can monitor the driver based on 2D or 3D images. The images are generated, for example, by color or monochrome cameras, near-IR cameras, and/or far-IR cameras. The images may be generated using one or more cameras, or may be extracted from video footage captured by one or more video cameras. A combination of different cameras may also be used, such as a color camera for daytime or high-light imaging, and an IR camera for nighttime or low-light image. An imaging sensor can capture the driver's face, facial parts, and/or body features and detect/monitor them using computer image processing algorithms.

Non-imaging sensors may also be used to detect the driver's behavior, either alone or in combination with imaging sensors. Examples of non-imaging sensors for detecting the driver's behavior include, but are not limited to, pressure sensors that are mounted, for example, on the driver seat and headrest areas, touch sensors that are implemented, for example, on the steering wheel of a vehicle, pressure sensors that are implemented, for example, on the brake and gas pedals, chemical sensors that are implemented to detect alcohol and illicit drugs, and microphones that are implemented to detect voices, levels of sounds, or a specific ring tone of a cell phone. Similar sensors can also be mounted on a driver such that the driver "wears" a sensor that can be placed on various parts of the driver's body. The non-imaging sensors may sense heat, temperature, movement, sound, and chemical analytes.

The sensors can be configured to differentiate between multiple drivers that share a single vehicle. Differentiation between multiple drivers may be performed using, for example, facial recognition systems, body weights, tone of voice, size of hands, the driver's height, and/or other distinguishing features of a driver. The differentiation can also be performed by a mechanism performing an analysis of sensor data from the sensors. Also, the differentiation can be performed by using S1 and/or S10 to detect/determine a driver based on a driver input/instruction.

Feature Extraction with 2D Images

In an exemplary embodiment, a single 2D camera (i.e. only one camera) is placed facing the driver to obtain face and upper body images. The single 2D camera may face the driver directly, or may face the driver at an angle. From the obtained images, distinct features and landmark points are extracted to determine reference positions or actions of the driver. Examples of the reference positions include, but are not limited to: shape of eyes, shape of mouth, shape of forehead, shape of cheeks, position of head, and/or position of hands. These reference positions are then used to train models that analyze the driver's facial and body movements.

Where non-imaging sensors are used to detect a driver's behavior, the distinct features may include, but are not limited to: a pressure sensed at certain locations on the driver's seat, a pressure sensed on the steering wheels, a pressure sensed on brake and gas pedals, a level of alcohol and illicit drugs sensed in the vehicle, and/or certain words detected using a voice processing algorithms.

Feature Extraction with 3D Images

In another exemplary embodiment, a 3D image or a 3D point cloud of a driver's head and body regions are generated using, for example, a 3D IR time-of-flight sensor, Light Detection And Ranging (LIDAR), or similar depth sensing sensor (including a stereoscopic camera or two cameras operating in tandem). From the 3D images and/or the 3D point cloud, distinct features and landmark points are extracted to determine reference positions or actions of the driver. Examples of the reference positions include, but are not limited to: shape of eyes, movement of eyes, location of nose, shape of mouth, shape of forehead, shape of cheeks, position of head, and/or position of hands. These reference positions are then used to train models that estimate the driver's facial and body movements.

The extracted features and landmark points are then provided to graphical models, for example, Hidden Markov Models, Conditional Random Forests, or similar models, to determine the driver's behavior. Such models analyze the images and provide outputs that are associated with certain behaviors that are secondary activities while driving, such as texting, talking on a cell phone, eating or drinking, bending on one side to grab an item, driving under the influence of a drug or alcohol, smoking, and/or similar behaviors that distract the driver from paying full attention to controlling the vehicle.

Estimating Driver's Perception of Potentially Hazardous Events

In step S3, a level of engagement in the secondary activities is estimated based on the analysis of the driver's behavior as described in the step S2. The secondary activities may be one or more activities that distract the driver from paying full attention to controlling a vehicle.

Various methods may be used to estimate a driver's level of engagement in the secondary activities. As an example, the driver's level of engagement in the secondary activities can be estimated based on an eyes-off-the-roadway (EOR) parameter that is defined by the percentage of the time that the driver's eyes are engaged in the secondary activity while driving. The EOR parameter is calculated, for example, based on gaze locations and fixation duration of the driver's eyes. The EOR parameter for the secondary activities may be combined with a prior history of the driver's EOR parameter to estimate the driver's level of engagement and the driver's capabilities in responding to potentially hazardous events.

Similar parameters, for example, hands-off-the-steering-wheels or head-not-positioned-straight-forward, may be defined and used to estimate a level of engagement in secondary activities. Additionally, a level of engagement in secondary activities may be a combination of engagement in one or more secondary activities such that a coefficient factor for each of the secondary activities determines the relative importance of each of the secondary activities when calculating the level of engagement in the secondary activities.

Further, the secondary activities are analyzed to determine whether or not the secondary activities may lead to another secondary activity. For example, when the driver checks a cell phone while driving, a potential distracting activity following checking the cell phone is responding to a text message, and/or making or answering a phone call. In this situation, although checking the cell phone consumes less time than sending text messages, but the checking leads to another high capacity task. As another example, when the driver drinks coffee while driving, a potential secondary activity following the drinking coffee activity is a potential coffee spill on the driver. Other examples include, but are not limited to, listening to music loudly that may lead to the driver dancing while driving, or smoking that may lead to the driver getting abrupt burns from a cigarette.

A driver's perception of external traffic conditions depends on the EOR parameter. Each of the secondary activities has a related EOR value. The EOR parameter is proportional to a level of the driver's perception of an external hazardous situation. For example, when the drivers is not fully engaged in controlling the vehicle, the EOR parameter increases because the driver's eyes are engaged in the secondary activities. As a result, the driver capabilities to control an external hazardous situation is reduced.

Examples for an EOR parameter are provided in "An Analysis of Driver Inattention Using a Case-Crossover Approach On 100-Car Data: Final Report Detecting External Events and Objects," by Klauer et al. (National Highway Traffic Safety Administration, US Department of Transportation, May 2010, FIG. 2) that is hereby incorporated by reference in its entirety.

At S11, which may be parallel to S2, one or more modules track external events and objects. Such external event modules can use one or more external sensors to continuously sense external events and objects and to provide information related to the external events and objects to the external event modules for continuous analysis. Examples of the external sensors include, but are not limited to, color or monochrome cameras, near-IR cameras, far-IR cameras, ultrasonic sensors, laser sensors, radar systems, and/or sound detectors. One or more of the external event modules receive the information related to the external events and objects from the external sensors and analyze the external events and objects.

Figure 2:
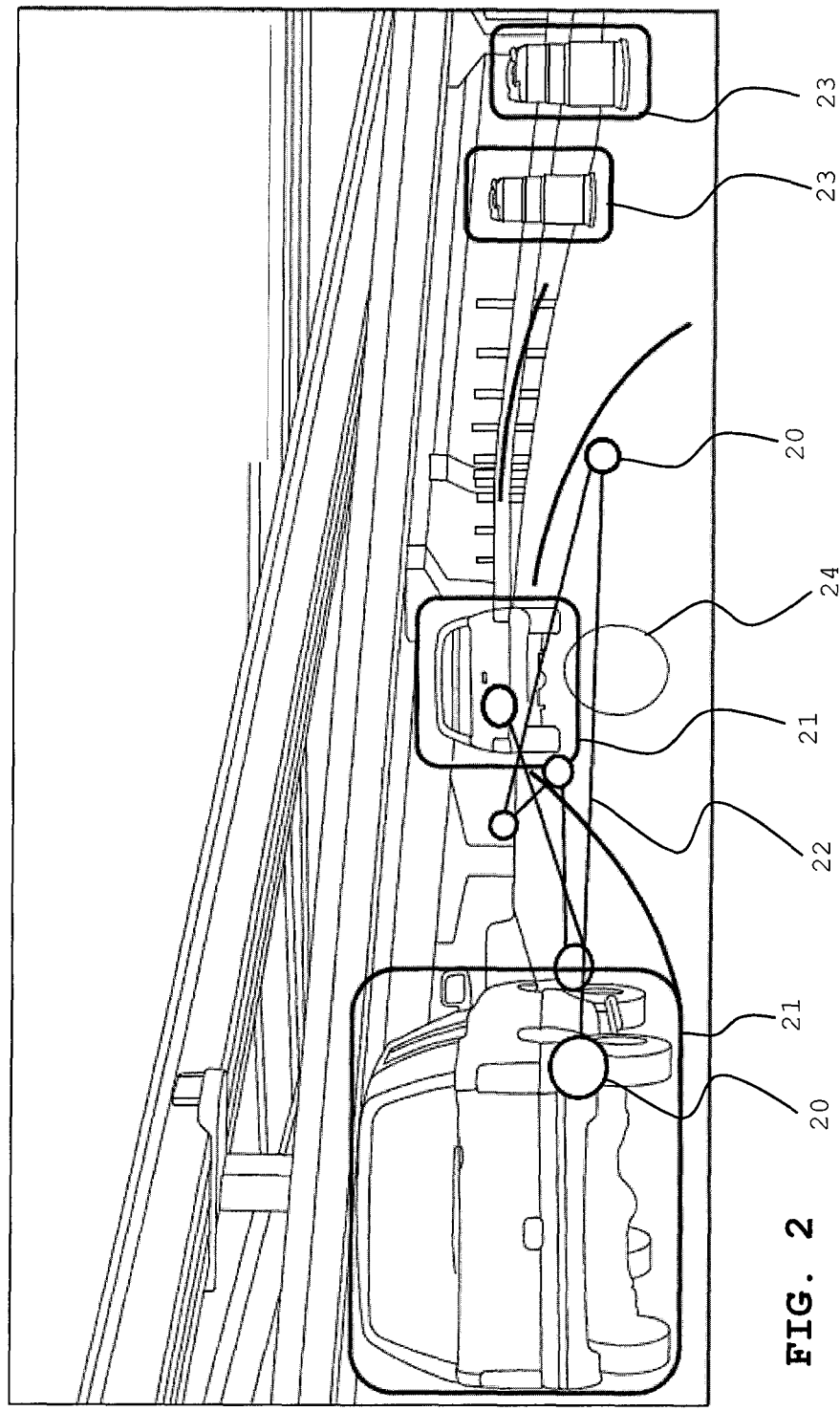
FIG. 2 illustrates examples of external events and external objects in a vicinity of a vehicle.

FIG. 2 illustrates examples of external events and external objects in a vicinity of a vehicle. Other vehicles in a vicinity 21 and traffic barrels 23 are shown in FIG. 2 as examples of external objects. Further, examples of external events can include, but are not limited to, another vehicle braking, accelerating, or decelerating in a vicinity of the vehicle, a pedestrian jumping in front of the vehicle, a cyclist being in a blind spot of the vehicle, a stop sign ahead of the vehicle, traffic light status change, and/or unsafe weather conditions. Additionally, FIG. 2 illustrates fixation duration of the driver's eyes 20 as circles such that the area of each circle corresponds to the period of fixation duration of the driver's eyes, and each circle is connected to another circle via saccade 22 that illustrates movement of the driver's eyes and gaze locations. In one implementation, a size of a circle increases in proportion with an amount of time the driver's eyes are fixated on a location associated with the circle. A space to enter 24 is illustrated with a circle that is a space on the road that a vehicle may drive the vehicle safely to that space.

Estimating Hazard Level for External Hazardous Situations

At S12, a hazard level is estimated based on the external events and objects detected in at S11. The hazard level can be in different formats, for example, from a low to a high scale corresponding to a low to a high risk of a collision occurring. The hazard level is high when the external events and objects are not normal. For example, when a lead vehicle brakes suddenly in a free flowing traffic or swivels unexpectedly, the external events and objects are not normal.

A vehicle's internal parameters can be combined with the detected external events and objects to estimate one or more hazard levels. Additionally, the vehicle's internal parameters are the parameters that are vital in responding to an external event or object. Examples of the vehicle's internal parameters include, but are not limited to, the vehicle's motion parameters, for example, vehicle speed and acceleration, vehicle's physical condition, for example, condition of brakes, tires, wipers, and/or lights.

Determining Driver's Ability to React to the External Hazard

At S4 and in an embodiment that does not include optional steps S11 and S12, it is determined whether or not the driver's level of engagement in secondary activities is above a certain threshold that may cause hazardous situations to occur. If the driver's level of engagement in secondary activities is below the threshold, the adaptive warning mechanism goes to the step S2 and continues to monitor and detect the driver's behavior. But, if the driver's level of engagement in secondary activities is above the threshold, the adaptive warning mechanism goes to S5.

In another embodiment of the present application that includes optional the steps S11 and S12, at the step S4, the driver's ability to handle an external hazard is determined based on the driver's perception in responding to the external hazardous situations that is estimated at the step S3 and the hazard level that is estimated at the optional step S12. In this exemplary embodiment, it is determined whether or not the hazard level and the driver's level of engagement in the secondary activities are above certain thresholds. If at least one of them are above one of the thresholds, then the adaptive warning mechanism goes to step S5. If not, the adaptive warning mechanism continues at the steps S2 and S11.

At step S5, the driver ability to respond to external hazardous situation is determined. For example, when the driver's level of engagement in secondary activities is above the threshold, hazardous situations are likely to occur because the driver is not fully engaged in controlling the vehicle. In such situations, no matter an external hazard exists or not, the driver's engagement in secondary activities can result in hazardous situations for the vehicle and other vehicles or individuals in a vicinity of the vehicle. For example, when the driver is not paying attention to driving, the driver may fail to notice that the vehicle is off track, the vehicle is crossing the lanes without a flasher being activated, and/or the driver may fail to notice that a lead vehicle is moving slower. On the other hand, the external hazardous situations may occur even though the driver is paying full attention to driving. In such scenarios, the driver's level of engagement in secondary activities is low and the driver is paying full attention to controlling the vehicle. As such, an external hazardous situation can occur for reasons not related to the driver's engagement in secondary activities. For example, a motorist may be in a blind area of the vehicle and the driver may fail to notice the motorist or a pedestrian may jump in front of the vehicle. At S5, it is also determined whether or not activating a hazard alert helps the driver to notice the hazardous situation.

A driver's ability to respond to the external hazard may be presented in different formats, for example, in a low to high scale format. Additionally, a driver's ability to respond to the external hazards can be calibrated using a history of the driver's response to similar events, and/or a history of the driver's normal driving habits.

Adjusting Hazard Alerts to Warn Driver

At S6, and after determining the driver's ability to respond the external hazardous situation, one or more hazard alerts are activated and adjusted to warn the driver. Such hazard alerts are aimed to warn the driver to quit secondary activities and to pay full attention to controlling the vehicle, or to warn the driver of an external hazard that the driver is not aware of. The hazard alerts may appear on various hazard warning devices that are installed in various locations inside the vehicle. Examples of the hazard warning devices are described in detail later in this application.

The timing of actuating the hazard alerts depends on a driver's perception of hazardous situations and the proximity and severity of external hazardous situations. An early actuation of the hazard alerts upon detection of an external hazardous situation or upon detection of the driver's engagement in secondary activities allows the driver to have sufficient time to respond to the hazard alerts and therefore is preferred. Additionally, such early adaptive activation prevents the driver from panicking.

When the driver is engaged in secondary activities and is weakly perceived of an external hazardous situation, an adaptive warning device actuates the hazard alerts in an early stage. Reaction time delays are used to estimate the timing for actuating the hazard alerts. The reaction time delays for secondary activities are mainly used to determine the timing for actuating the hazard alerts.

Examples of the adaptive warning include, but are not limited to, changes in a tone of a audible alert, which can rapidly increase to make the tone become severe, and combining an audible alarm with tactile feedback, for example, by vibrating the driver's seat, and/or displaying visual signals to indicate an external hazardous situation to a driver.

To produce the hazard alerts in a timely manner, for example, as quickly as possible, at the step S6, the driver's behavior is constantly monitored to recognize engagement in secondary activities. Each of the secondary activities is associated with a corresponding reaction time delay. The driver's perception in responding to the external hazardous situations can be estimated by, for example, the EOR parameter, and the proximity of the hazard.

Figure 4:
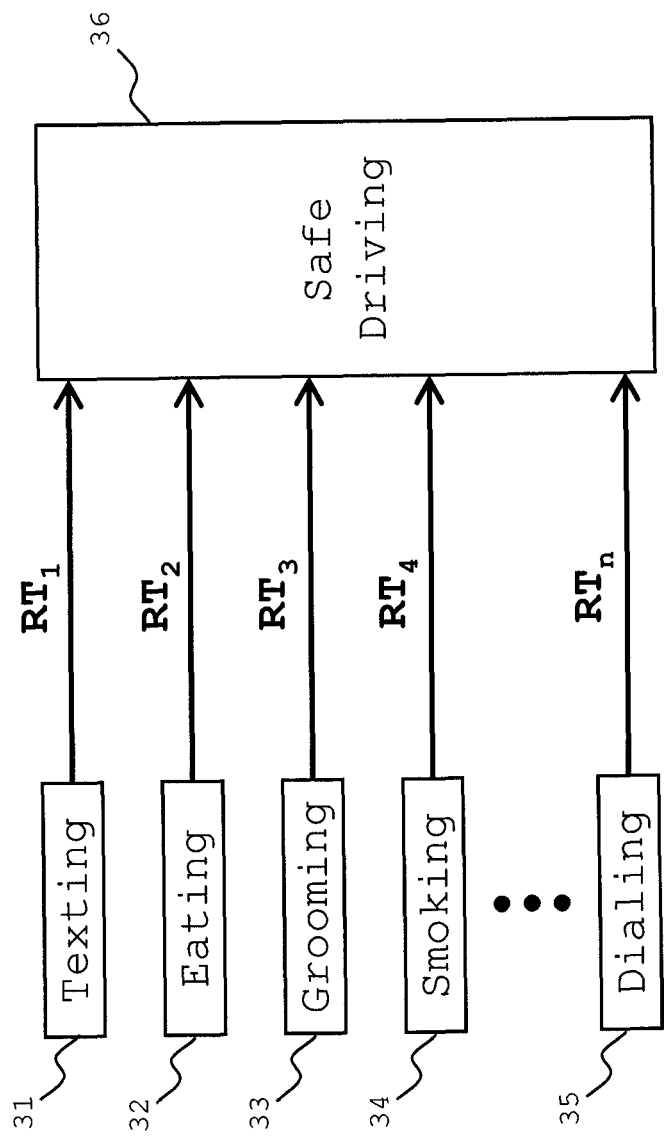
FIG. 4 schematically illustrates reaction time delays associated with secondary activities.

An engagement in at least one secondary activity is detected, for example, by analyzing the 2D and 3D images. Examples of the secondary activities include, but are not limited to, using a cell phone for a phone conversation or texting, using a smart phone for browsing, extended focus on objects and events outside the forward roadway, eating, drinking, smoking, grooming, reading maps or books, changing a CD, interacting with a navigation system, reaching to grab items inside the vehicle or interacting with other passengers in the vehicle. The reaction time delays are defined as a time required for a driver to abandon the secondary activity and pay full attention to control the vehicle. As shown in FIG. 4, the reaction time delays are recorded as safe driving indicators and are used to estimate driver's ability to react to the external hazardous situations at the step S5 and S6.

Detecting Driver's Reaction to the Hazard Alerts and Adaptively Adjusting Hazard Alerts At steps S7, S8, and optional step S13, after the hazard alerts are activated, the driver's reaction to the hazard alerts is detected and analyzed. This may be done using a feedback mechanism and an iterative process. The sensors described previously at S1 is used to monitor and detect the driver's reaction. Then, the driver's reaction is analyzed and compared to one or more predetermined reactions. There is an expected and predetermined reaction for each of the actuated warning alerts. The predetermined reactions can be different for different drivers sharing a single vehicle. If the reaction of the driver to the warning alerts is different than the expected and predetermined reaction, the adaptive warning mechanism adaptively adjusts the hazard alerts. The process of detecting and monitoring a driver's reaction, comparing the driver's reaction to the expected and predetermined reaction, and adjusting the hazard alert accordingly creates an iterative process such that the hazard alert can be adaptively adjusted based on the driver's reaction to the external hazardous situation.

The optional step S13, may also be included in the iterative process such that a hazard level corresponding to an external hazardous situation is also monitored in the iterative process. Such hazard level for an external hazardous situation is then used in the iterative process of the adaptive warning mechanism. As a result, an active monitoring of driver's behavior and the hazard level and timely adjusting the hazard alert leads to the iteratively actuating and adjusting hazard alerts.

Terminating the Hazard Alert when Driver is not Engaged in Secondary Activities At S9, warnings and hazard alerts are terminated when the driver reaction is in accordance with predetermined and expected reaction. After terminating the hazard alert, the process goes to the step S1.

Figure 3:
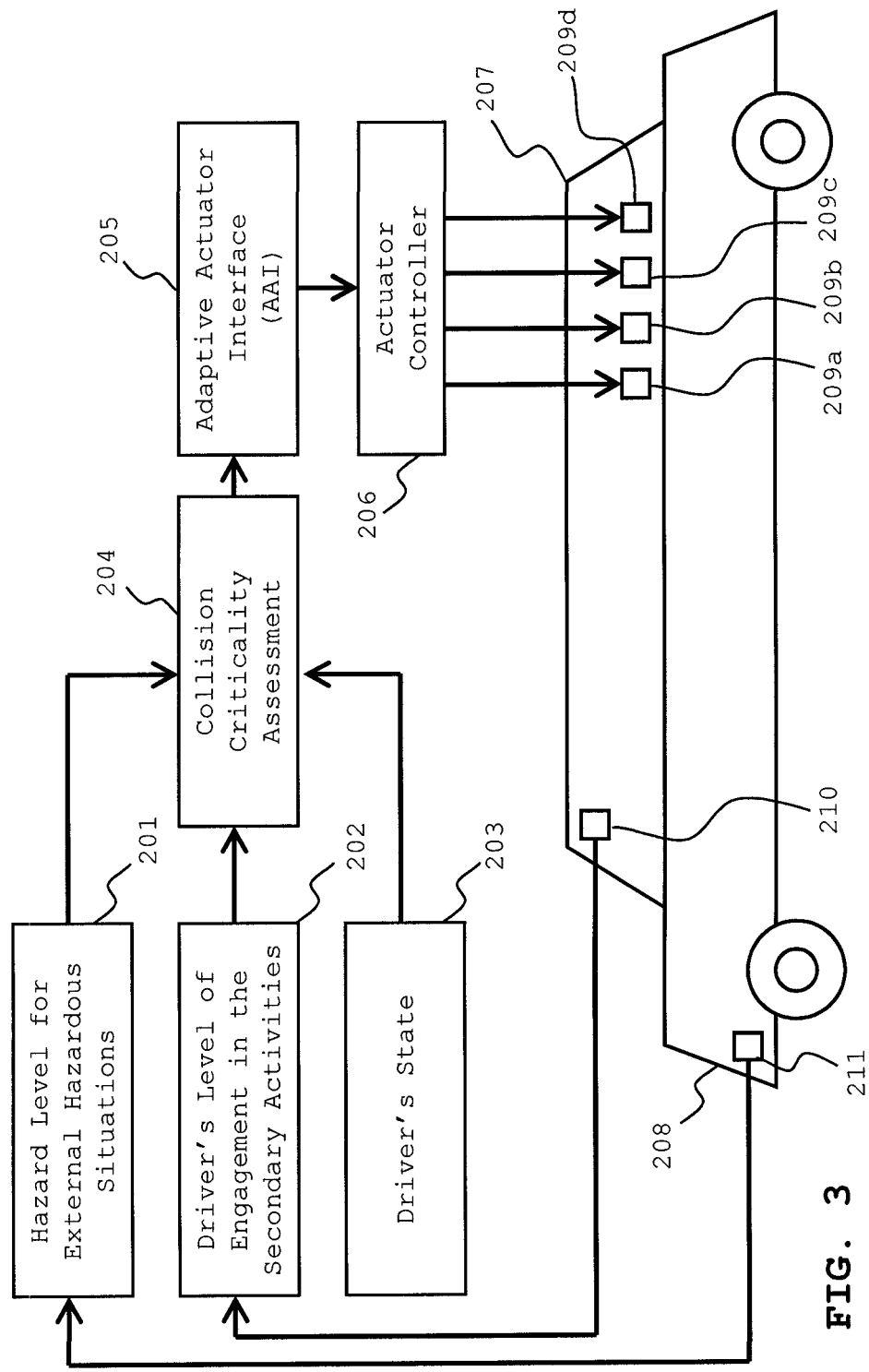
FIG. 3 illustrates modules for an adaptive warning mechanism used in a vehicle.

Functional modules for implementing an exemplary embodiment of the adaptive warning mechanism are shown in FIG. 3. A module for estimating the driver's engagement in the secondary activities 202 generates a level of engagement in the secondary activities for the driver based on one or more sensors 210 implemented inside a driver cabin 207 of a vehicle 208. A module for estimating hazard level 201 generates a hazard level based on the external sensors 211 implemented on the vehicle 208. A driver state unit 203 receives input from the driver with respect to the drivers state in controlling the vehicle. Then, a module for collision criticality assessment 204 generates an output for an adaptive actuator interface 205 based on the hazard level, driver's level of engagement in secondary activities, and/or the drivers state. The adaptive actuator interface 205 generates an output to an actuator controller 206. The actuator controller 206 controls the hazard alerts 209 that are placed inside the driver cabin 207.

The collision criticality assessment module 204 feeds the adaptive actuator interface 205 with collision severity information based on driver's secondary task engagement, state of the driver, and a level of hazard at a given time. The adaptive actuator interface 205 based on the inputs provided by collision criticality assessment 204 decides how to actuate the hazard alerts 209 to warn the driver. One or more parameters may be considered with respect to actuating the hazard alerts, for example, modes of actuation, types of actuation, and/or frequency and amplitude of actuation.

One or more types of the hazard alerts 209 are utilized in the vehicle. Examples of the hazard alerts 209 include, but are not limited to, Olfactory 209a: generating varying aroma sensations to activate the driver; Visual 209b: displaying warning messages and icons in different colors and/or contrast; Audible 209c: generating alarms with varying tone and/or pitch; and Haptic 209d: generating vibrations in the driver's seat, steering wheel, and/or headrest area.

Selecting the types of hazard alerts 209 to be actuated is based on a state of the driver. Examples of the driver's state include, but are not limited to, drowsy or fatigued state, bored or lost-in-thoughts state, and active and excited state. Based on the driver's states, types of the hazard alerts 209 are selected for actuation and for making the driver aware of the hazard.

Timing for the actuation is determined based on the type of the secondary activities and the level of engagement in the secondary activities that are detected by the module for estimating the driver's engagement in the secondary activities 202. Controlling the timing for actuating the hazard alerts 209 is important to avoid annoying, panicking, and/or distracting the driver. Therefore, the adaptive warning mechanism, as a main feature, includes producing a timely warning for the driver for safe driving.

The perception Time To Collision ($TTC_{per}$) is a factor that relates the driver's reactive behavior to act and avoid an external hazardous situation. Therefore, $TTC_{per}$ is based on driver's perception to the external hazard, thus, proportional to the Percentage EOR parameter, that is:

$$TTC_{PER} \propto \text{Percentage EOR} \quad (1)$$

The reaction time delays for the secondary activities are estimated using baseline indices having predetermined values. The reaction time delays are used to estimate the driver's ability to react to the external hazard at the steps S5 and S6.

These baseline indices are used for the baseline estimation of the reaction time delays, and are refined iteratively during actual runs to personalize for each driver characteristics.

At S5, a collision criticality assessment module 204 uses information from driver state 203 and the reaction time delays for the secondary activities to estimate the time required for the driver to act upon an external hazardous situation when a hazard alert is activated.

Figure 5:
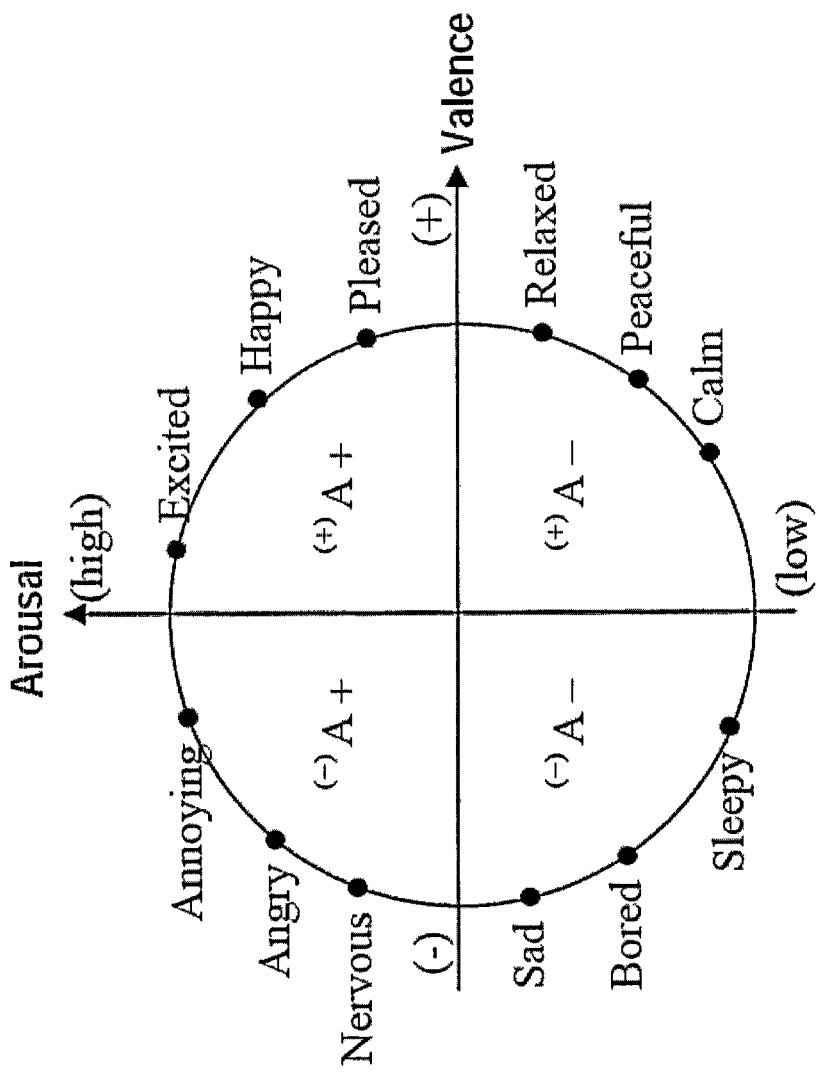
FIG. 5 is a diagram of a driver's state in an arousal and valance space.

The driver state while operating the vehicle is determined using the driver's facial features and facial motion patterns, voice cues in the driver's conversation, and physiological sensory estimates. The driver state shows high and low arousal states with positive and negative valences as shown in a diagram in the Arousal-Valance space of FIG. 5. Examples of facial features and facial motion patterns include, but are not limited to, displacement of eye corners and eyelids, mouth corners, upper and lower lip position, and facial muscle movement in forehead and cheeks area.

Figure 6:
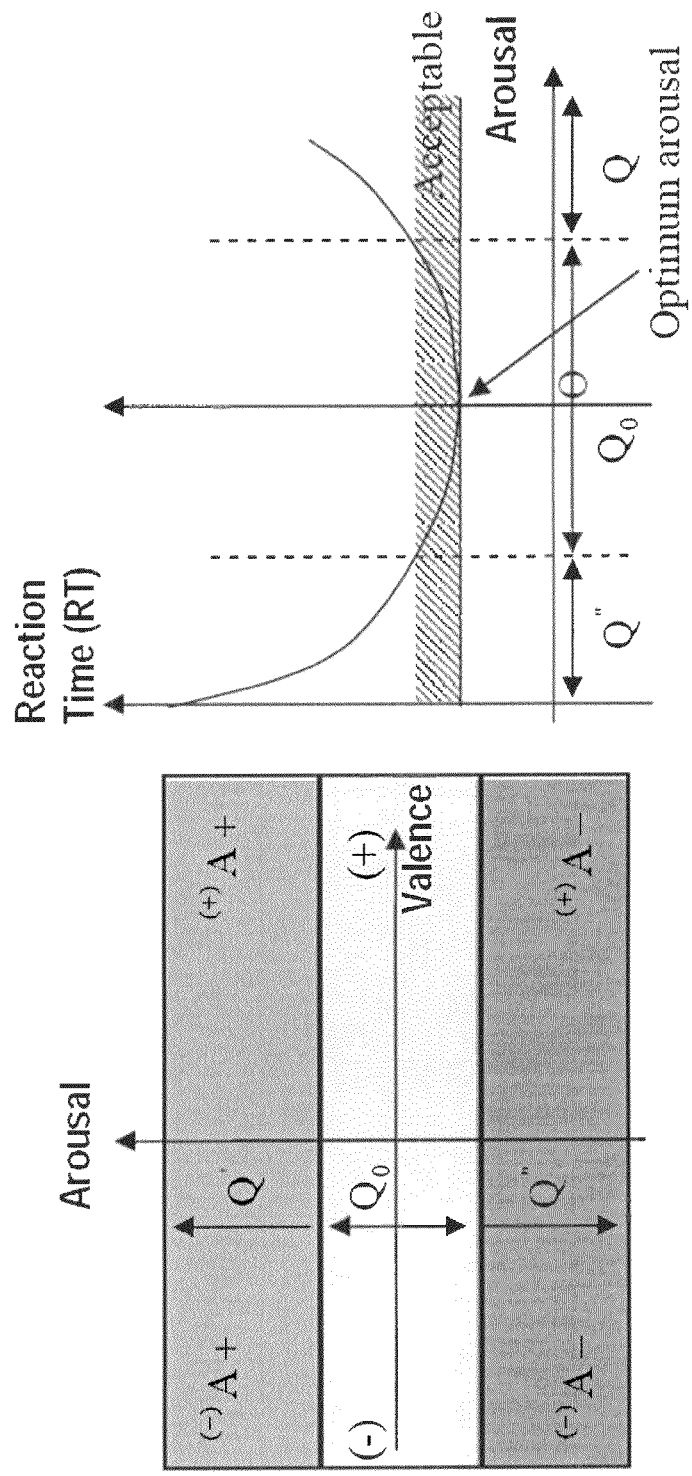
FIG. 6 is a diagram illustrating arousal vs. reaction time.

FIG. 6 illustrates the relationship of Arousal-Valence space. An optimum level of arousal is required to achieve high performance with low reaction time (RT).

β denotes a state variable that represent the driver state at a given time. Therefore, the Total Time ($T_{tot}$) for a driver to act upon a hazard can be computed with the following formula:

$$T_{tot} = RT \frac{1}{1-\beta} + TTC_{per} \quad (2)$$

where, β is stipulated as, $$\beta = \begin{cases} \beta'' & \text{if } Q''; \text{ where } \alpha'' \leq \beta'' < 0 \\ \beta & \text{if } Q_0; \text{ where } \alpha'' \leq \beta'' < 0 \\ \beta' & \text{if } Q'; \text{ where } \alpha' \leq \beta' < 0 \end{cases} \quad (3)$$

Where, α" is a non-zero negative scalar value that typically equals to −1 and, α is a non-zero positive scalar value that typically equals to 0.5 and, α' is a non-zero negative scalar value that typically equals to −0.8, for a larger population of drivers.

Based on a total time computed in equation (2) and proximity of the external hazardous situations estimated at S12, the driver's ability to react to the hazardous situations is determined. This information can be used at S5 and S6 to determine the most appropriate time to activate the hazard alert.

The adaptive actuator interface 205 uses the information from driver's ability to react to an identified hazardous situation and changes the mode, the type, and the timing of the hazard alert to inform the driver at an appropriate and early time interval. This can provide enough time for the driver to react without being panicked or annoyed. The adaptive warning mechanism combines driver's normal driving behavior, for example, braking characteristics, and information with respect to the proximity of a hazardous situation together with reaction time delays.

Figure 7:
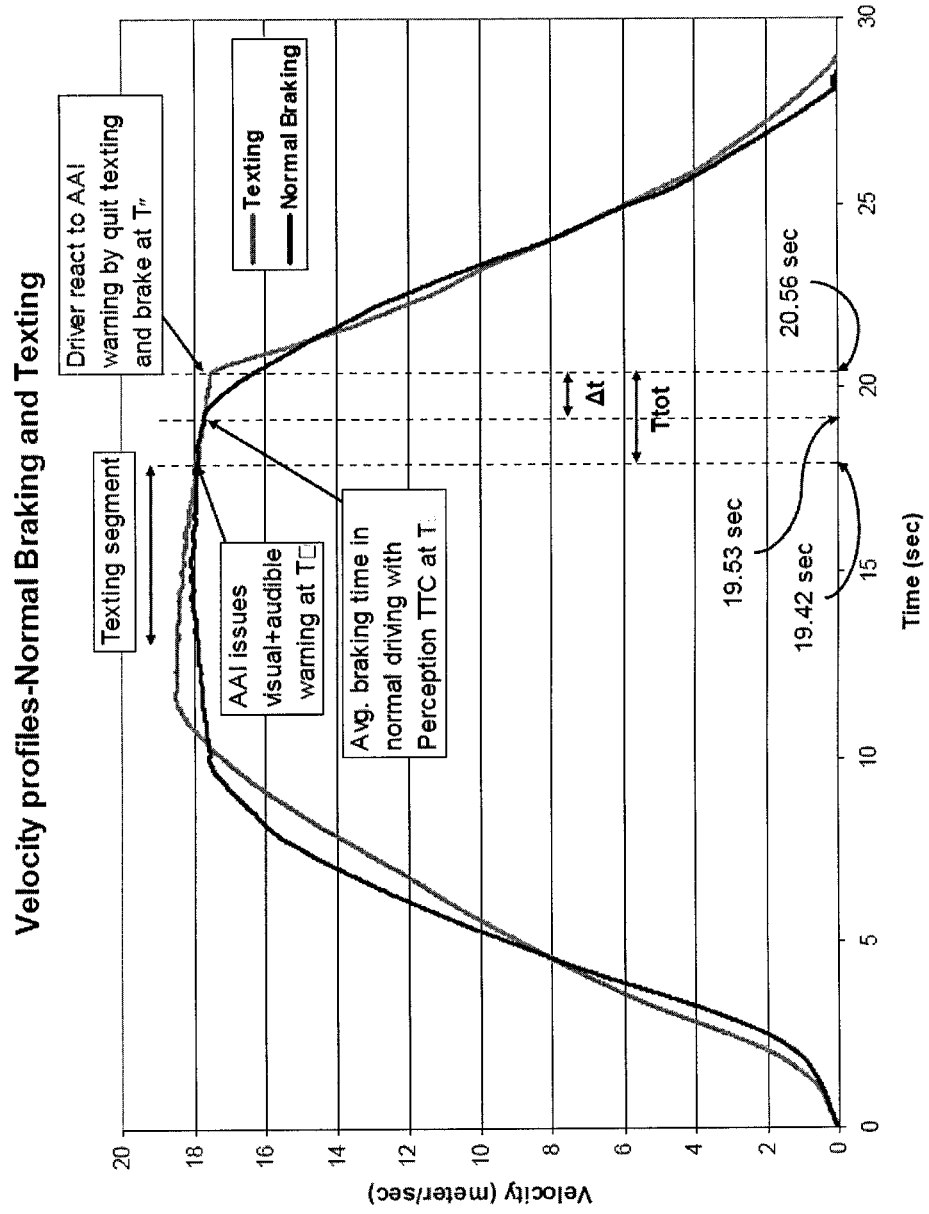
FIG. 7 is a graph illustrating a warning that is issued when texting is detected as a secondary activity.

FIG. 7 illustrates an example of the actuation timing for a driver. The blue curve indicates the driver accelerates to about 40 meters/second and then breaks at $T_0=19.53$ seconds to stop behind a leading vehicle stopped at a traffic light. The red curve indicates the driver at almost similar speed (~40 miles/hour) while being engaged in texting as a secondary activity. The adaptive actuator interface module 205 detects the driver's texting activity and issues early visual and audible hazard alerts to the driver at T'=19.42 seconds. Then, the driver reacts to the hazard alert and quits the texting activity to brake at T"=20.56 seconds. Although the initiation of braking in the case of texting has exceeded Δt second, the initiation of braking falls within drivers comfortable braking region without causing annoyance or panic as evident in the trailing edge of the curve since the initiation of braking is in line with normal braking.

Figure 8:
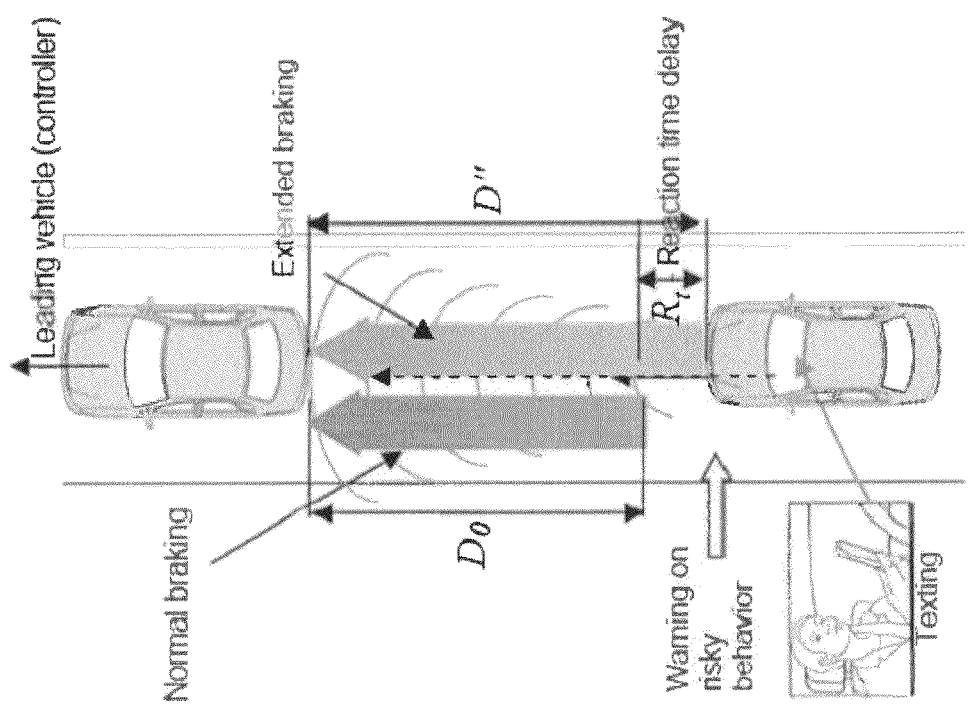
FIG. 8 illustrates an adaptive warning mechanism in a car-following scenario.

Following, examples of the adaptive warning mechanism are described:

In the case of a car-following scenario as illustrated in FIG. 8, the mechanism estimates a distance and a relative velocity between the vehicles, and factors in the driver's state and the driver's engagement in secondary activities to determine a total reaction time. The warning initiation time is then determined based on the determined total reaction time.

Figure 9:
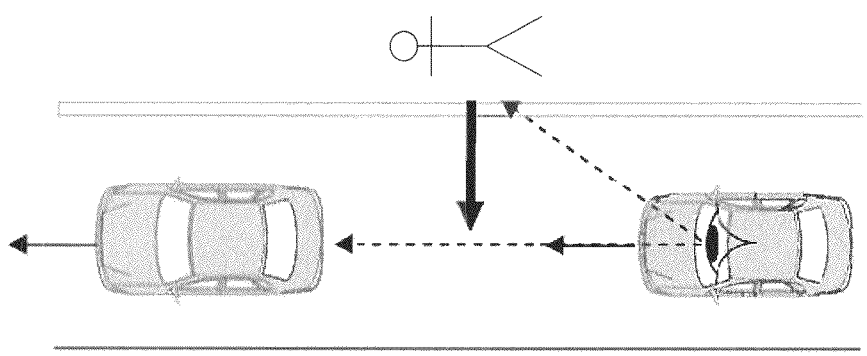
FIG. 9 illustrates an adaptive warning mechanism where external objects are moving towards the vehicle.
Figure 10:
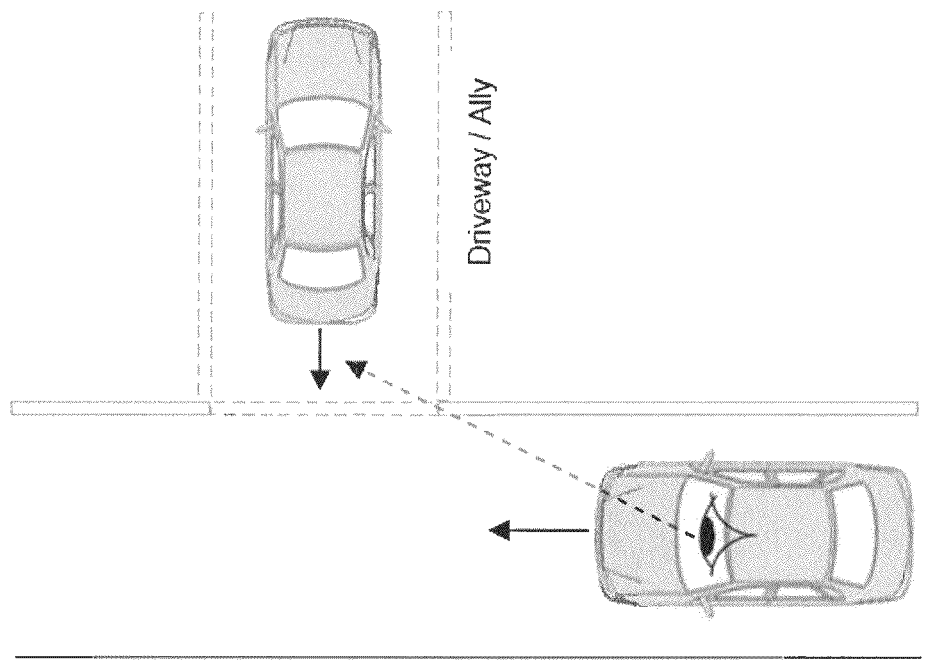
FIG. 10 illustrates an adaptive warning mechanism where another vehicle is moving towards the vehicle.

In situations where external objects are moving towards the vehicle as illustrated in FIG. 9 and FIG. 10, the mechanism calculates velocities of the approaching objects and estimates a secondary Time-To-Collision. Accordingly, the warning initiation time is determined based on the secondary Time-To-Collision.

Figure 11:
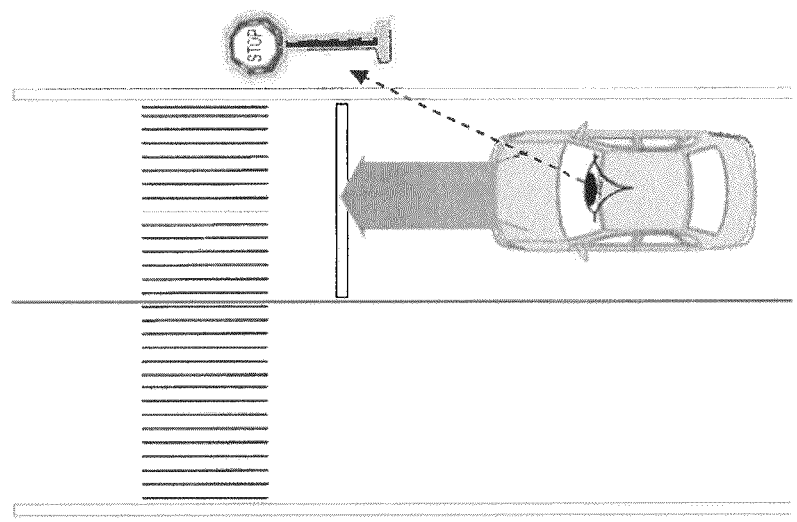
FIG. 11 illustrates an adaptive warning mechanism where the vehicle is approaching a traffic sign.
Figure 12:
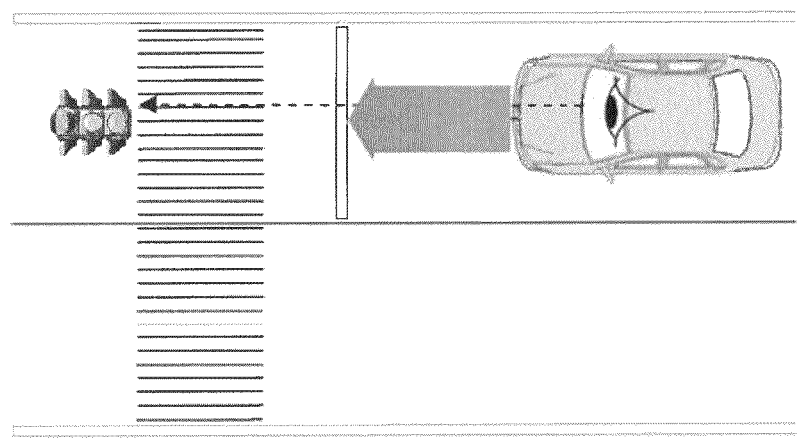
FIG. 12 illustrates an adaptive warning mechanism where the vehicle is approaching a traffic light.

In situations where the vehicle is approaching a traffic light or a traffic sign as illustrated in FIG. 11 and FIG. 12, the mechanism monitors and detects the traffic light or the traffic signs. Then, the mechanism determine whether the driver is controlling the vehicle based on the traffic light and the traffic signs. If the driver's driving is not according to the traffic light or the traffic signs, the mechanism actuates warnings and monitors the driver's reaction to the warning. The mechanism adjusts the warning based on the driver's response and terminates the warning when the driver is fully engaged in controlling the vehicle.

Figure 13:
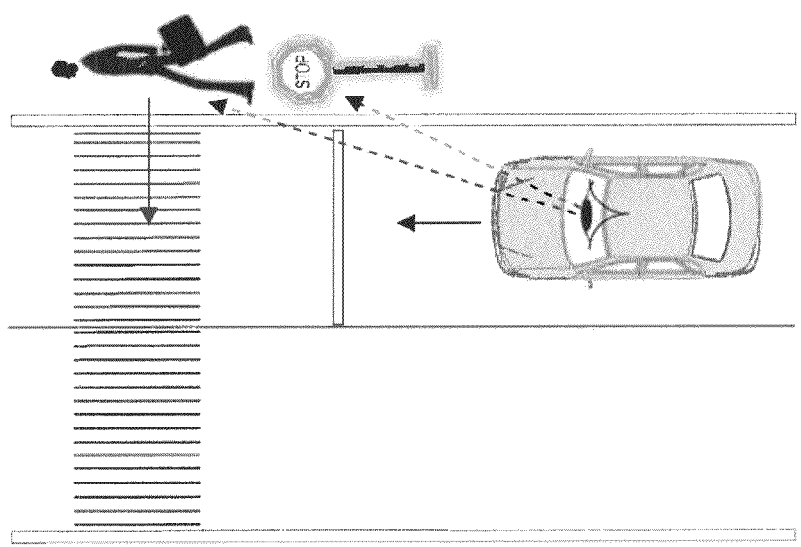
FIG. 13 illustrates an adaptive warning mechanism where a moving object crosses a path of the vehicle in the presence of traffic controlling device.

In situations where an external object crosses a path of the vehicle in presence of a traffic controlling device, for example, a pedestrian crossing as illustrated in FIG. 13, the mechanism detects and combines the driver's awareness to the traffic controlling device with a velocity of the external object to determine a Time-To-Collision. Then, the mechanism actuates warnings in a timely manner based on the Time-To-Collision and monitors the driver's reaction to the warnings. The mechanism adjusts the warning based on the driver's response and terminates the warning when the driver is fully engaged in controlling the vehicle.

Figure 14:
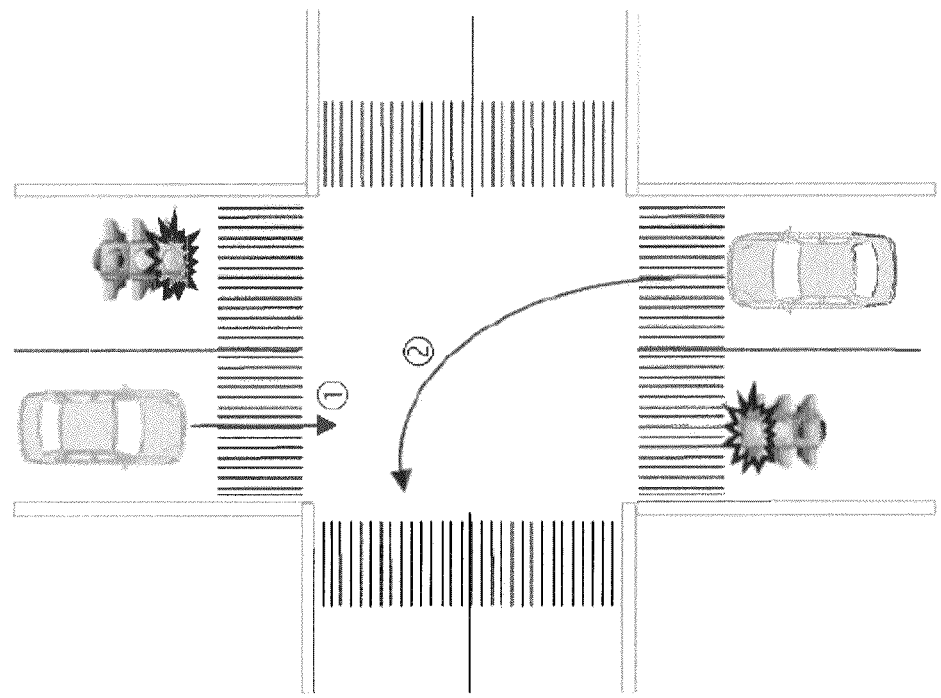
FIG. 14 illustrates an adaptive warning mechanism in a traffic light controlled intersection.
Figure 15:
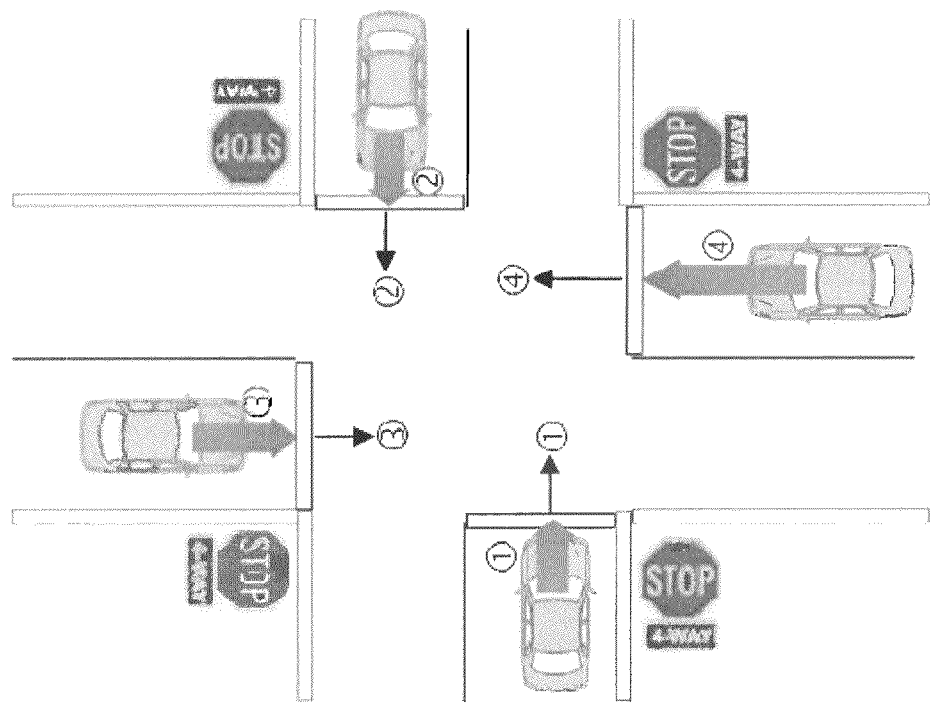
FIG. 15 illustrates an adaptive warning mechanism in an intersection with four stop signs.

In situations where the vehicle travels in multi-lane roads as illustrated in FIG. 14 and FIG. 15, the adaptive warning system detects the oncoming traffic and approaching velocities of the vehicles in a vicinity of the vehicle. For example, in a traffic light controlled intersection where the driver is expected to make a maneuvers across (in line with or away from) the oncoming traffic (as in left turn, run straight or right turn), the system monitors the driver's secondary task behavior and produces a warning or a hazard alert. Exemplary situations include traffic light controlled intersections, stop sign controlled intersections, roundabouts, and similar traffic-merging environments.

Figure 16:
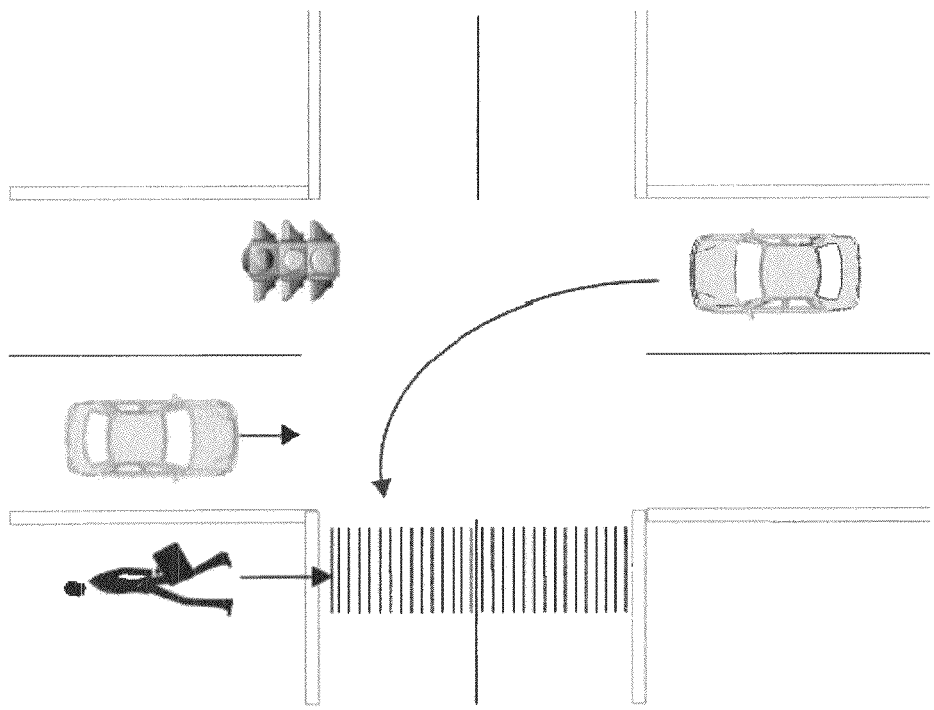
FIG. 16 illustrates an adaptive warning mechanism in a traffic light controlled intersection with pedestrian and other vehicles in the intersection.

In situations where moving objects cross the traffic path as in the case of pedestrians, bicyclists and/or similar external objects in an intersection as illustrated in FIG. 16, the adaptive warning mechanism detects the velocities of the objects and estimates the Time To Collision parameter. Based on the driver's engagement in secondary task activities, the adaptive warning mechanism issues a warning alert at an appropriate early time interval.

Figure 17:
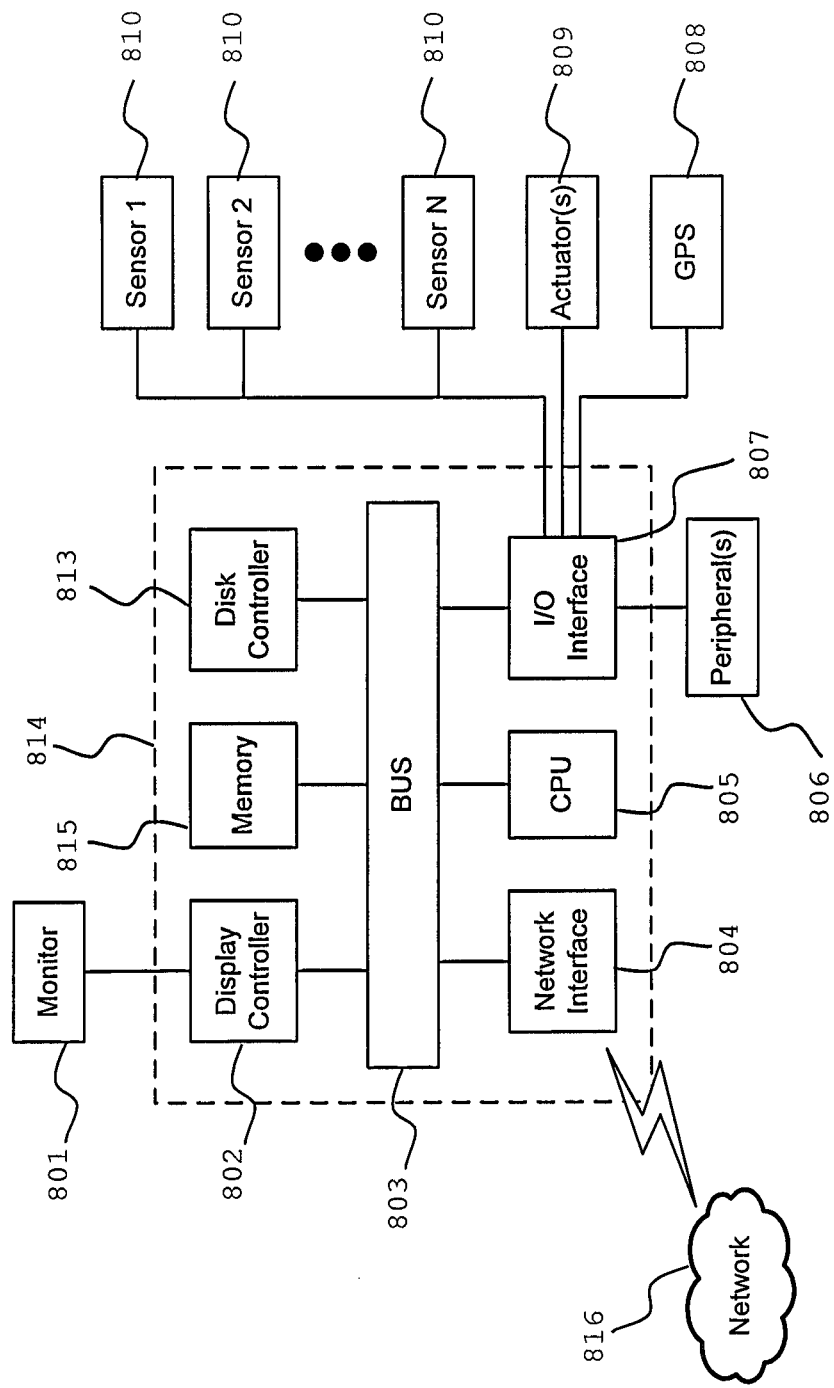
FIG. 17 is an exemplary hardware configuration of a controller for an adaptive warning mechanism.

FIG. 17 illustrates an exemplary processing system, and illustrates exemplary hardware found in a mechanism, controller or computing system for implementing and/or executing the processes, algorithms and/or methods described in this disclosure. The system can be embodied and/or implemented as an electronic control unit (ECU) or a discrete computer installed in a vehicle, machine, user-interface device, or monitoring device. Further, multiple ECUs can provide distributed processing with respect to various aspects of this disclosure.

As shown in FIG. 17, a processing system 814 in accordance with this disclosure can be implemented using a microprocessor 805 or its equivalent, such as one or more central processing units (CPUs) and/or at least one application specific processor ASP (not shown). The microprocessor 805 utilizes a computer readable storage medium 815, such as a memory (e.g., ROM, EPROM, EEPROM, flash memory, static memory, DRAM, SDRAM, and their equivalents), configured to control the microprocessor 805 to perform and/or control the processes and systems of this disclosure. Other storage mediums can be controlled via a controller, such as a disk controller 813, which can control a hard disk drive or optical disk drive.

The microprocessor 805 or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit form parallel processing capabilities of a multi-cored CPU, and/or distributed processing across a plurality of controllers, computer processors and/or electronic control units.

In another aspect, results of processing in accordance with this disclosure can be displayed via a display controller 802 to a monitor 801. The display controller 802 would then preferably include at least one graphic processing unit for improved computational efficiency. Additionally, an I/O (input/output) interface 807 is provided for inputting sensor data from Sensors 1, 2 . . . N 810, and for outputting control signals to one or more actuators 809 to control various actuated components, including steering, brake and throttle controllers/actuators of a vehicle, as well as PCS warning devices (including audio and visual alarms). A global positioning system 808 (e.g., GPS) can be provided and connected to the I/O interface 807 for location information of the vehicle.

Further, as to other input devices, the same can be connected to the I/O interface 807 as a peripheral 806. For example, a keyboard or a pointing device (not shown) for controlling parameters of the various processes and algorithms of this disclosure can be connected to the I/O interface 807 to provide additional functionality and configuration options, or control display characteristics. Moreover, the monitor 801 can be provided with a touch-sensitive interface to a command/instruction interface.

The above-noted components can be coupled to a network 816, as shown in FIG. 17, such as the Internet or a local intranet, via a network interface 804 for the transmission or reception of data, including controllable parameters. The network can also be a vehicle local area network (VLAN), in which input/output data (e.g., sensor, actuator data/commands, and GPS information) are transmitted via the VLAN, either as an input to or an output from the system. The VLAN can be utilized for facilitating distributed processing within a vehicle. A central BUS 803 is provided to connect the above hardware components together and provides at least one path for digital communication there between.

A number of implementations have been described. Nevertheless, it will be understood that various modifications may be made without departing from the spirit and scope of this disclosure. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. An apparatus to adaptively warn a driver, comprising:
   a detector configured to detect a behavior of the driver, the behavior including engagement in a secondary activity, which is an activity other than driving a vehicle, and further configured to detect a reaction of the driver to an actuated warning alert;
   a processor configured to estimate, based on the detected behavior, a level of engagement in the secondary activity, and to estimate, based on the estimated level of engagement in the secondary activity and a reaction time delay of the secondary activity that includes a time required to abandon the secondary activity and to pay attention to control the vehicle, a level of perception of the driver to an external hazard; and
   an actuator configured to actuate a warning alert for the driver when the level of perception is below a threshold, wherein
   the processor is configured to adjust an actuated warning alert of the actuator based on a detected reaction, by the detector, of the driver to the actuated warning alert.

2. The apparatus according to claim 1, wherein the processor is configured to terminate an actuated warning alert when the driver's level of perception is determined to be above the threshold by the processor, based on a reaction of the driver to the actuated warning alert.

3. The apparatus according to claim 1, wherein the driver's level of perception that is required for the driver to safely control the vehicle is determined based on reaction time delays of secondary activities.

4. The apparatus according to claim 3, wherein predetermined reaction time delays for different secondary activities are used as baseline values, and a new set of reaction time delays are generated by the processor based on monitored behavior of the driver to personalize the reaction time delays.

5. The apparatus according to claim 4, wherein the new set of reaction time delays are generated in a personalization process, which is performed in situations where no external hazard is present and the driver is engaged in secondary activities, such that personalized reaction time delays for the driver are generated by detecting the driver's reaction time to quit secondary activities and to fully engage in driving.

6. A method for adaptively warning a driver, comprising:
   detecting a behavior of the driver, the behavior including engagement in a secondary activity, which is an activity other than driving a vehicle;
   estimating, based on the detected behavior, a level of engagement in the secondary activity;
   estimating, based on the estimated level of engagement in the secondary activity and a reaction time delay of the secondary activity that includes a time required to abandon the secondary activity and to pay attention to control the vehicle, a level of perception of the driver to an external hazard;
   actuating a warning alert for the driver when the level of perception is determined to be below a threshold;
   detecting a reaction of the driver to the actuated warning alert; and
   adjusting, based on the detecting of the reaction of the driver to the actuated warning alert, the warning alert.

7. The method according to claim 6, further comprising:
   terminating the warning alert when the level of perception becomes above the threshold because of the reaction of the driver to the actuated warning alert.

8. The method according to claim 6, further comprising:
   receiving inputs from the driver about a status of the driver.

9. The method according to claim 6, wherein reaction time delays for secondary activities are estimated based on baseline indices.

10. The method according to claim 6, wherein types of hazard alerts being actuated are selected based on a state of the driver.

11. The method according to claim 6, wherein the level of perception that is required for the driver to safely control the vehicle is determined based on reaction time delays of secondary activities.

12. The method according to claim 11, wherein predetermined reaction time delays for different secondary activities are used as baseline values, and a new set of reaction time delays are generated based on monitored behavior of the driver to personalize the reaction time delays.

13. The method according to claim 12, wherein the new set of reaction time delays are generated in a personalization process, which is performed in situations where no external hazard is present and the driver is engaged in secondary activities, such that personalized reaction time delays for the driver are generated by detecting the driver's reaction time to quit secondary activities and to fully engage in driving.

14. The method according to claim 6, wherein the warning alert for the driver includes one or more of:

varying aroma sensations;

warning messages and icons in different colors and contrast;

sounds with varying tone and pitch; and vibrations in the driver's seat, steering wheel, headrest area.

15. The method according to claim 6, further comprising: monitoring the external hazard, and adjusting the hazard level based on results of the monitoring.

16. A non-transitory computer readable medium including executable instructions, which when executed by a processor, cause the processor execute a method for adaptively warning a driver, comprising:

detecting a behavior of the driver, the behavior including engagement in a secondary activity, which is an activity other than driving a vehicle;

estimating, based on the detected behavior, a level of engagement in the secondary activity;

estimating, based on the estimated level of engagement in the secondary activity and a reaction time delay of the secondary activity that includes a time required to abandon the secondary activity and to pay attention to control the vehicle, a level of perception of the driver to an external hazard;

actuating a warning alert for the driver when the level of perception is determined to be below a threshold;

detecting a reaction of the driver to the actuated warning alert; and adjusting, based on the detecting of the reaction of the driver to the actuated warning alert, the warning alert.

17. The non-transitory computer readable medium according to claim 16, the method further comprising:

terminating the warning alert when the level of perception becomes above the threshold because of the reaction of the driver to the actuated warning alert.

18. The non-transitory computer readable medium according to claim 16, wherein the level of perception that is required for the driver to safely control the vehicle is determined based on reaction time delays of secondary activities.

19. The non-transitory computer readable medium according to claim 18, wherein predetermined reaction time delays for different secondary activities are used as baseline values, and a new set of reaction time delays are generated based on monitored behavior of the driver to personalize the reaction time delays.

20. The non-transitory computer readable medium according to claim 19, wherein the new set of reaction time delays are generated in a personalization process, which is performed in situations where no external hazard is present and the driver is engaged in secondary activities, such that personalized reaction time delays for the driver are generated by detecting the driver's reaction time to quit secondary activities and to fully engage in driving.

* * * * *